United States Patent
Wang et al.

(10) Patent No.: US 9,749,967 B2
(45) Date of Patent: Aug. 29, 2017

(54) SPATIAL REUSE PARAMETERS FOR OPPORTUNISTIC ADAPTIVE TPC AND CCA

(71) Applicant: MEDIATEK INC., Hsinchu (TW)

(72) Inventors: James June-Ming Wang, San Marino, CA (US); Jianhan Liu, San Jose, CA (US); Chao-Chun Wang, Taipei (TW); YungPing Hsu, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/257,074

(22) Filed: Sep. 6, 2016

(65) Prior Publication Data

US 2017/0070962 A1 Mar. 9, 2017

Related U.S. Application Data (60) Provisional application No. 62/215,055, filed on Sep. 7, 2015, provisional application No. 62/220,365, filed on
(Continued)

(51) Int. Cl.
*H04W 52/24* (2009.01)
*H04W 52/50* (2009.01)
(Continued)

(52) U.S. Cl.
CPC ........ *H04W 52/243* (2013.01); *H04B 17/345* (2015.01); *H04W 16/02* (2013.01);
(Continued)

(58) Field of Classification Search
CPC ............. H04W 84/12; H04W 74/0816; H04W 52/243; H04W 52/50; H04W 52/16; H04W 28/18; H04W 16/00; H04W 52/242; H04W 52/245; H04W 72/0473; H04W 52/247; H04W 17/345
(Continued)

(56) References Cited

U.S. PATENT DOCUMENTS

2016/0233940 A1* 8/2016 Huang ................. H04B 7/0452

FOREIGN PATENT DOCUMENTS

WO WO2015112780 A1 7/2015

OTHER PUBLICATIONS

EPO, Search Report for the EP patent application 16187572.9 dated Dec. 19, 2016 (9 pages).
(Continued)

*Primary Examiner* — Keith Ferguson
(74) *Attorney, Agent, or Firm* — Imperium Patent Works; Zheng Jin (57) ABSTRACT

A method of spatial reuse with opportunistic transmit power control (TPC) and clear channel assessment (CCA) is proposed. In the opportunistic TPC and CCA, a spatial reuse station (SR-STA) gains enough knowledge in certain situation for more aggressive spatial reuse such that its transmit power may be adjusted to meet the spatial reuse conditions based on the received OBSS PPDU and the corresponding spatial reuse parameter (SRP). Both Type 1 SRP and Type 2 SRP are defined. In one example, the Type 1 or Type 2 SRP is a 5-bit parameter carried in the HE-SIG-A field of the OBSS PPDU, which can be a trigger frame, a response frame, a request-to-send (RTS)/clear-to-send (CTS) frame, and a data frame.

22 Claims, 5 Drawing Sheets

Related U.S. Application Data on Sep. 18, 2015, provisional application No. 62/220,367, filed on Sep. 18, 2015, provisional application No. 62/254,227, filed on Nov. 12, 2015, provisional application No. 62/254,799, filed on Nov. 13, 2015.

(51) Int. Cl.
*H04B 17/345* (2015.01)
*H04W 16/02* (2009.01)
*H04W 74/08* (2009.01)
*H04W 52/14* (2009.01)
*H04W 84/12* (2009.01)

(52) U.S. Cl.
CPC ....... *H04W 52/241* (2013.01); *H04W 52/242* (2013.01); *H04W 52/247* (2013.01); *H04W 52/50* (2013.01); *H04W 74/0816* (2013.01); *H04W 52/146* (2013.01); *H04W 52/245* (2013.01); *H04W 84/12* (2013.01)

(58) Field of Classification Search
USPC .... 455/522, 69, 67.11, 63.1, 63.2, 450, 509, 455/426.1, 426.2, 550.1, 403, 422.1, 445, 455/127.1–127.3; 370/338, 329, 252, 370/278, 328, 343, 318
See application file for complete search history.

(56) References Cited

OTHER PUBLICATIONS

Reza Hedayat et al., NEWRACOM, Perspectives on Spatial Reuse in 11ax, doc: IEEE 802.11-14/1580r0, Dec. 2014 (21 pages).
James Wang et al., MediaTek, Spatial Reuse and Coexistence with Legacy Devices, doc: IEEE 802.11-14/0637r0, May 2014 (10 pages).

* cited by examiner

SPATIAL REUSE TRANSMISSION WITHIN A TXOP

FIG. 7

SPATIAL REUSE TRANSMISSION WITHIN A TXOP

SPATIAL REUSE PARAMETERS FOR OPPORTUNISTIC ADAPTIVE TPC AND CCA

CROSS REFERENCE TO RELATED APPLICATIONS

This application claims priority under 35 U.S.C. §119 from U.S. Provisional Application No. 62/215,055, entitled "Update on Adaptive TPC and CCA," filed on Sep. 7, 2015; U.S. Provisional Application No. 62/220,365, entitled "Adaptive CCA and TPC," filed on Sep. 18, 2015; U.S. Provisional Application No. 62/220,367, entitled "Update on Adaptive TPC and CCA," filed on Sep. 18, 2015; U.S. Provisional Application No. 62/254,227, entitled "Opportunistic Adaptive TPC and CCA," filed on Nov. 12, 2015; U.S. Provisional Application No. 62/254,799, entitled "Spatial Reuse Parameter for Opportunistic Adaptive TPC and CCA," filed on Nov. 13, 2015; the subject matter of which is incorporated herein by reference.

TECHNICAL FIELD

The disclosed embodiments relate generally to wireless network communications, and, more particularly, to opportunistic adaptive Clear Channel Assessment (CCA) and Transmit (TX) Power Control (TPC) for spatial reuse in wireless communications systems.

BACKGROUND

IEEE 802.11 is a set of media access control (MAC) and physical layer (PHY) specification for implementing wireless local area network (WLAN) communication, called WiFi, in the unlicensed (2.4, 3.6, 5, and 60 GHz) frequency bands. The standards and amendments provide the basis for wireless network products using the WiFi frequency bands. For example, IEEE 802.11ac is a wireless networking standard in the 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac.

In IEEE 802.11ac, a transmitter of a BSS (basis service set) of certain bandwidth is allowed to transmit radio signals onto the shared wireless medium depending on clear channel assessment (CCA) sensing and a deferral or backoff procedure for channel access contention. For a BSS of certain bandwidth, a valid transmission sub-channel shall have bandwidth, allowable in the IEEE 802.11ac, equal to or smaller than the full bandwidth of the BSS and contains the designated primary sub-channel of the BSS. Based on the CCA sensing in the valid transmission bandwidths, the transmitter is allowed to transmit in any of the valid transmission sub-channels as long as the CCA indicates the sub-channel is idle. This dynamic transmission bandwidth scheme allows system bandwidth resource to be efficiently utilized.

An enhanced distributed channel access protocol (EDCA) is used in IEEE 802.11ac as a channel contention procedure for wireless devices to gain access to the shared wireless medium, e.g., to obtain a transmitting opportunity (TXOP) for transmitting radio signals onto the shared wireless medium. The simple CSMA/CA with random back-off contention scheme and low cost ad hoc deployment in unlicensed spectrum have contributed rapid adoption of WiFi systems. Typically, the EDCA TXOP is based solely on activity of the primary channel, while the transmit channel width determination is based on the secondary channel CCA during an interval (PIFS) immediately preceding the start of the TXOP. The basic assumption of EDCA is that a packet collision can occur if a device transmits signal under the channel busy condition when the received signal level is higher than CCA level.

Today, Wi-Fi devices are over-populated. Dense deployment has led to significant issues such as interference, congestion, and low throughput. Raising CCA levels has been shown to increase spatial re-use, which leads to significant increase in the network throughput in some dense deployment scenarios. In dense deployment scenario with multiple small BSS footprints in which APs and non-AP STAs are mostly exchanging frames at the highest MCS (modulation and coding), the baseline CCA level −82 dBm leads to excessive deferral and thus lower overall throughput. By increasing CCA level (OBSS interference) for all BSSs in the scenario, the operating SNR is still above the level required for max MCS. The specific link throughput does not degrade, but CCA deferral is reduced (likelihood of channel access increased) leading to increased network throughput.

In general, increasing CCA levels for inter-BSS packets can enhance the spatial reuse because more simultaneous transmissions can happen in multiple OBSSs. However, significant percentage of spatial reuse transmission will affect the MCSs of the on-going frame exchange. Spatial reuse introduced collision causes loss in throughput before link adapts lower MCSs. As a result, interference mitigation, such as transmit power control (TPC) should be employed during spatial reuse transmission to avoid collision with on-going frame exchange in a dense environment. Furthermore, the current adaptive TPC and CCA only considers interference mitigation for the transmitting device. A solution of spatial reuse for opportunistic adaptive TPC and CCA protecting both transmitting and receiving devices is sought.

SUMMARY

A method of spatial reuse with opportunistic transmit power control (TPC) and clear channel assessment (CCA) is proposed. In the opportunistic TPC and CCA, a spatial reuse station (SR-STA) gains enough knowledge in certain situation for more aggressive spatial reuse such that its transmit power may be adjusted to meet the spatial reuse conditions based on the received OBSS PPDU and the corresponding spatial reuse parameter (SRP). Both Type 1 SRP and Type 2 SRP are defined. In one example, the Type 1 or Type 2 SRP is a 5-bit parameter carried in the HE-SIG-A field of the OBSS PPDU, which can be a trigger frame, a response frame, a request-to-send (RTS)/clear-to-send (CTS) frame, and a data frame.

In one embodiment, an initiating spatial reuse station (SR-STA) detects an ongoing frame exchange associated with one or more overlapping basic service set (OBSS) stations (OBSS-STAs) in a wireless communication network. The SR-STA decodes a spatial reuse parameter (SRP) from the detected ongoing frame exchange. The SR-STA determines a transmit power or power density level based on the SRP for satisfying a list of spatial reuse conditions. The SR-STA performs a channel access procedure to initiate a spatial reuse frame exchange with a responding SR-STA in concurrent with the ongoing frame exchange upon satisfying the list of spatial reuse conditions.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
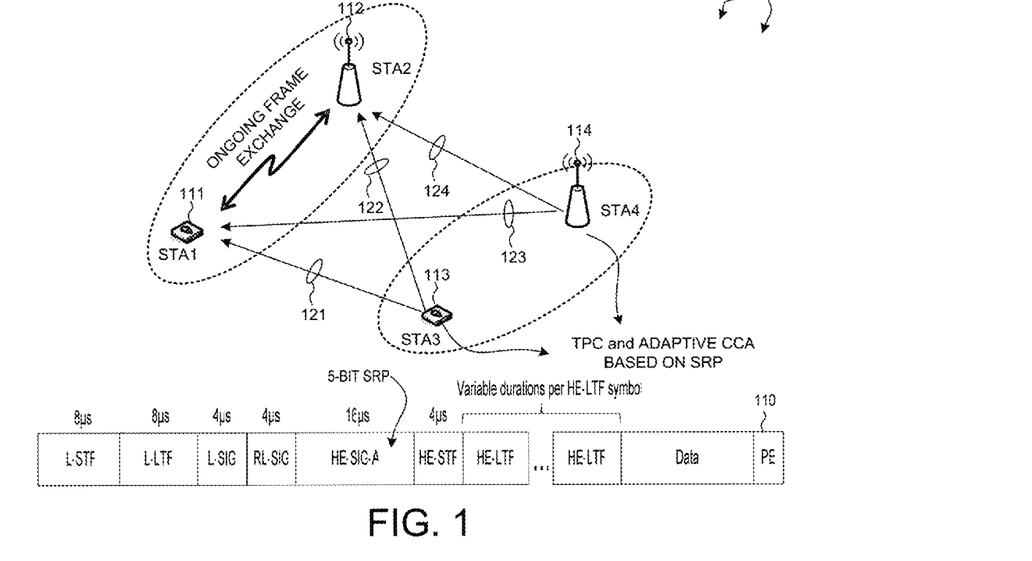
FIG. 1 illustrates a wireless network having overlapping BSS (OBSS) with spatial reuse in accordance with one novel aspect.

FIG. 1 illustrates a wireless network 100 having overlapping basic service set (OBSS) with spatial reuse in accordance with one novel aspect. Wireless network 100 comprises a plurality of wireless stations 111 (STA1), 112 (STA2), 113 (STA3), and 114 (STA4). Each station can be an access point station (AP-STA), or a non-AP-STA. STA1 and STA2 belong to a first BSS1, and STA3 and STA4 belong to a second BSS2. BSS1 and BSS2 are overlapping BSS (OBSS) with overlapping coverages. In the example of FIG. 1, STA1 and STA2 have gained the access to the wireless medium and have ongoing frame exchange between them. Meanwhile, STA3 is a spatial reuse SR-STA trying to initiate a frame exchange with STA4.

In IEEE 802.11 wireless networks, an enhanced distributed channel access protocol (EDCA) is used as a channel contention procedure for wireless devices to gain access to the shared wireless medium, e.g., to obtain a transmitting opportunity (TXOP) for transmitting radio signals onto the shared wireless medium. During the first stage of EDCA, the TXOP is obtained based solely on activity of the primary channel. The primary channel is BUSY if one of the predefined conditions is met based on Clear Channel Assessment (CCA) sensitivity levels. During the second stage of EDCA, the transmit channel width is selected based on the secondary channel CCA during an interval (PIFS) immediately preceding the start of TXOP. The secondary channel is BUSY if one of the predefined conditions is met based on CCA levels.

IEEE 802.11ac is a wireless networking standard in the 802.11 family providing high-throughput WLANs on the 5 GHz band. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac.

In general, raising CCA levels has been shown to increase spatial re-use, which leads to significant increase in the network throughput in some dense deployment scenarios. In dense deployment scenario with multiple small BSS footprints in which APs and non-AP STAs are mostly exchanging frames at the highest MCS (modulation and coding), the baseline (primary channel) CCA level −82 dBm leads to excessive deferral and thus lower overall throughput. However, significant percentage of spatial reuse transmission will affect the MCSs of the on-going frame exchange. Spatial reuse introduced collision causes loss in throughput before link adapts lower MCSs. As a result, interference mitigation, such as transmit power control (TPC) should be employed during spatial reuse transmission to avoid collision with on-going frame exchange in a dense environment. Furthermore, the current adaptive TPC and CCA only considers interference mitigation for the transmitting device.

In one novel aspect, an opportunistic TPC and adaptive CCA is proposed for spatial reuse. SR-STA gains enough knowledge in certain situation for more aggressive spatial reuse such that its TX power may be adjusted to meet the spatial reuse conditions based on the received OBSS PPDU and the corresponding spatial reuse parameter (SRP). As illustrate in FIG. 1, if STA3 wants to establish a link with STA4 without interfering with STA1/STA2 with spatial reuse, it requires several pre-conditions: 1) STA3 needs to identify whether the STA1/STA2 link is an inter-BSS (OBSS) link or an intra-BSS link; 2) STA3 should not cause interference to both STA1 and STA2, e.g., radio signal 121 does not interfere STA1 and radio signal 122 does not interfere STA2; and 3) STA4 should not cause interference to both STA1 and STA2, e.g., radio signal 123 does not interfere STA1 and radio signal 124 does not interfere STA2. In the current baseline EDCA procedure, pre-conditions 2) and 3) might only be partially satisfied, i.e., STA3 and STA4 might cause interference to one of STA1 or STA2. In a preferred embodiment, TPC and adaptive CCA is applied by STA3 and/or STA4 to satisfy the preconditions based on SRP for spatial re-use and thereby increasing network throughput.

Furthermore, a simplified TPC for spatial reuse is proposed. A spatial reuse parameter (SRP) is defined as a single parameter, which can be signaled to the SR-STA for determining its TX power for spatial reuse purpose. In a first embodiment, a Type 1 SRP is defined. In a second embodiment, a Type 2 SRP is defined. As depicted in FIG. 1, the Type 1 or Type 2 SRP is carried in the HE-SIG-A field of PPDU 110. In one example, the Type 1 or Type 2 SRP is a 5-bit parameter carried in the HE-SIG-A field of PPDU 110, which can be a trigger frame, a response frame, a request-to-send (RTS)/clear-to-send (CTS) frame, and a data frame of the ongoing OBSS frame exchange.

Figure 2:
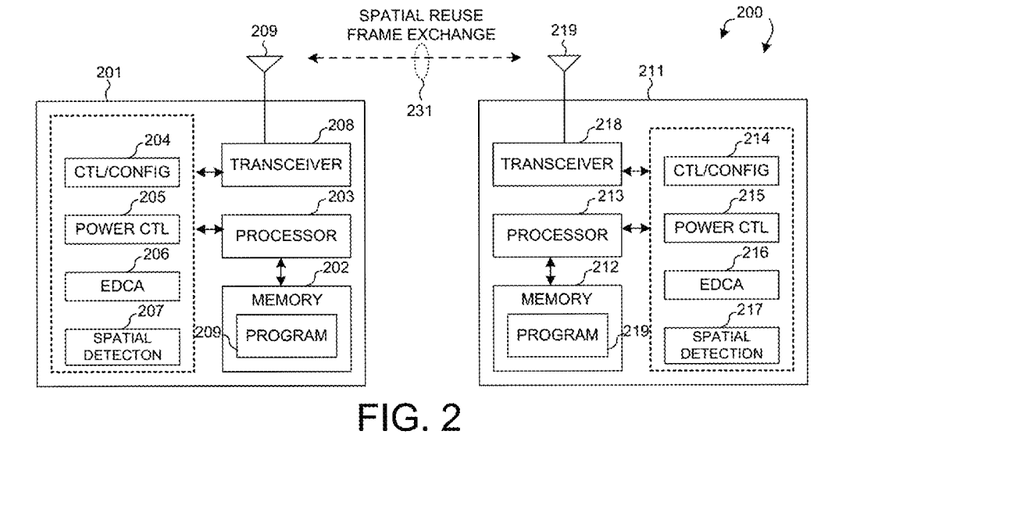
FIG. 2 is a simplified block diagram of as initiating device and a responding device in accordance with embodiments of the present invention.

FIG. 2 is a simplified block diagram of an initiating device 201 and a responding device 211 in a wireless network 200 in accordance with one novel aspect. Initiating device 201 comprises memory 202, a processor 203, a control and configuration module 204, a power controller 205, an EDCA module 206, a spatial re-use detection module 207, and a transceiver 208 coupled to antenna 209. Similarly, responding device 211 comprises memory 212, a processor 213, a control and configuration module 214, a power controller 215, an EDCA module 216, a spatial re-use detection module 217, and a transceiver 218 coupled to antenna 219. In the transmitting direction, the transceiver converts received baseband signals from the processor to RF signals and sends out to the antenna. Similarly, in the receiving direction, the processor processes the received baseband signals from the transceiver and invoke different functional modules to be configured to perform various features supported by the wireless devices.

The different modules are functional modules and circuits that can be implemented in software, firmware, hardware, or any combination thereof. The function modules and circuits, when executed by processors 203 and 213 (via program instructions 209 and 219 contained in memory 202 and 212), interwork with each other to allow the wireless devices to perform opportunistic channel access with spatial re-use. For example, the spatial reuse detection circuit detects radio signals/PPDUs, decodes parameters, and observes the wireless medium to confirm that it is allowed to start a spatial reuse frame exchange 231, the EDCA module contends the wireless medium for spatial reuse with other STAs through a random backoff EDCA procedure, the control and configuration circuit performs various control and configuration functionalities, and the power control circuit determines and controls a transmit (TX) power level (or TX spectral power density) such that spatial re-use frame exchange 231 does not cause interference in the network.

Figure 3:
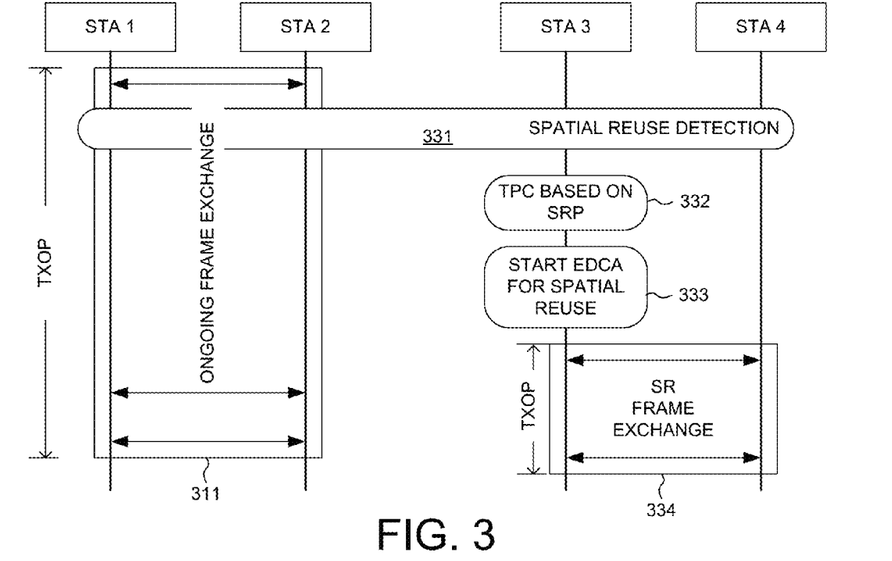
FIG. 3 illustrates a method flow of a wireless device performing spatial reuse frame exchange in a wireless network.

FIG. 3 illustrates a method flow of a wireless device performing spatial reuse frame exchange in a wireless network. The wireless network comprises a plurality of stations STA1, STA2, STA3, and STA4. In step 311, STA1 and STA2 have gained a TXOP to access the wireless medium and have ongoing frame exchange between them. STA3 is trying to initiate a frame exchange with STA4 by exploiting spatial reuse of the wireless medium. In step 331, STA3 performs spatial reuse detection and observes the on-going frame exchange in the wireless medium to confirm whether STA3 is allowed to start a spatial reuse frame exchange. First, STA3 needs to identify whether the received PPDU from STA1/STA2 is from inter-BSS for intra-BSS. In order to do that, STA1/STA2 should signal their BSS color, or TX IDs and RX IDs. A BSS color is a shortened indication (e.g., a 3/5-bit indication) of BSS ID, which is chosen by an AP based on its observation of BSS colors of overlapping neighbor BSSs. Second, STA3 needs to know the remaining PPDU duration of the ongoing STA1-STA2 frame exchange so that STA3 can gain a spatial reuse TXOP that is fair.

In a preferred embodiment, in step 332, STA3 applies TPC in determining its TX power level based on obtained spatial reuse parameter (SRP). STA3 decides whether its TX power level is sufficient to close the link with STA4 based on the SRP and its prior experience or observation. If there is not sufficient margin to close the link, STA3 abandons its attempt for spatial re-use based on current spatial detection. If STA3 has sufficient link margin, it then determines its TX power based on the SRP to satisfy a list of spatial reuse conditions such that it can perform EDCA backoff procedure. The list of spatial reuse conditions may include: the estimated interference at the OBSS PPDU recipient (STA/STA2) is less than a value; the NAV is not set; the backoff counter of the EDCA procedure has counted down to zero. In step 333, STA3 performs an EDCA backoff procedure to contend the wireless medium for spatial reuse frame exchange with STA4. Finally, in step 334, STA3 gains a spatial reuse TXOP and starts frame exchange with STA4. The spatial reuse TXOP is restricted to the OBSS PPDU duration between STA1 and STA2. STA4 is engaging in spatial reuse detection when it receives a spatial reuse packet from STA3. In a preferred embodiment, STA4 applies TPC in determining its TX power level when it transmits a response to STA3.

Figure 4:
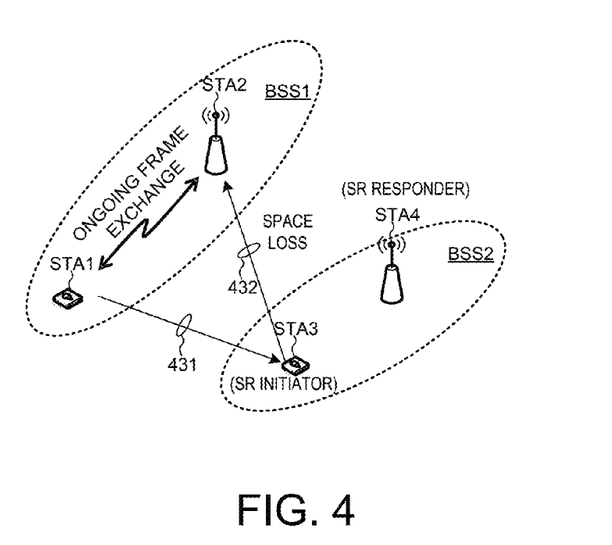
FIG. 4 illustrates a Type-1 SRP for TPC and adaptive CCA level for spatial reuse in accordance with one novel aspect.

FIG. 4 illustrates Type-1 SRP for TPC for spatial re-use in accordance with one novel aspect. In the embodiment of FIG. 4, STA1 and STA2 have ongoing frame exchange in BSS1, and STA3 is a spatial reuse SR-STA that applies transmit power control (TPC) to ensure that any spatial reuse frame exchange with STA4 in BSS2 will not causing interference. Specifically, for STA3 not to interfere with STA2 reception, the required TX power back off can be determined as follows.

TX-PWR_STA3−Space Loss (STA3 to STA2)<Received Interference Level (STA2);

Space Loss (STA3 to STA2)=TX-PWR_STA2−RSSI (by STA3 from STA2);

In accordance with one novel aspect, define Type 1 SRP as follows, and the required TX power backoff can be simplified as follows.

SRP=TX-PWR_STA2+Received Interference Level (STA2);

TX-PWR_STA3<SRP−RSSI (by STA3 from STA2);

Therefore, by signaling the SRP to STA3, STA3 can determines its own TX power control (TPC) level based on the above equation for signal 432 not interfering STA2 reception. In addition, STA3 can also determine its own TX power level for signal 431 not interfering STA1 reception. STA3 should select the lower TX power level such that STA3 would not cause interference to both STA1 and STA2. Note that higher TX-PWR_STA2 or Received Interference Level (STA2) allows STA3 to raise its transmit power. If we allow 20 dB adjustment in both TX-PWR_STA2 or Received Interference Level (STA2) with 2 dB step, a total of 5 bit is needed in SRP as a single parameter. If STA2 has excess link margin (already at highest MCS), it should add the excess link margin to SRP, which allows STA3 to further raise its transmit power. Specifically, the signaled "Received Interference Level (STA2)" in SRP should be "Received Interference Level (STA2)+excess link margin". However, additional error margin may be subtracted from the TX-PWR_STA3.

The opportunistic TPC and adaptive CCA scheme can be used if an IEEE 802.11ax STA detects a valid OBSS PPDU with the SR parameters. The 11ax STA has full knowledge of the situation to allow it to attempt more aggressive spatial reuse. Under the above situation, the 11ax STA may discard the PPDU if the spatial reuse conditions are met, noting that the SR parameters may be dynamically modified from a nominal value and such adjustment might cause the SR and SR conditions to be met or not to be met. For example, the SR conditions might be: 1) the estimated interference at the OBSS PPDU recipient is less than a value x, which is defined by the SRP; 2) the NAV is not set; and 3) the backoff has counted down to zero. When the OBSS PPDU is first decoded, the SR-STA might not meet all of these conditions. However, if the SR-STA chooses to reduce its TX power, then it might be able to meet the SR conditions. In other words, the SR-STA can modify its TX power in an attempt to meet all of the SR conditions, and by modifying its TX power, it might go from NOT meeting the conditions to meeting the conditions.

Figure 5:
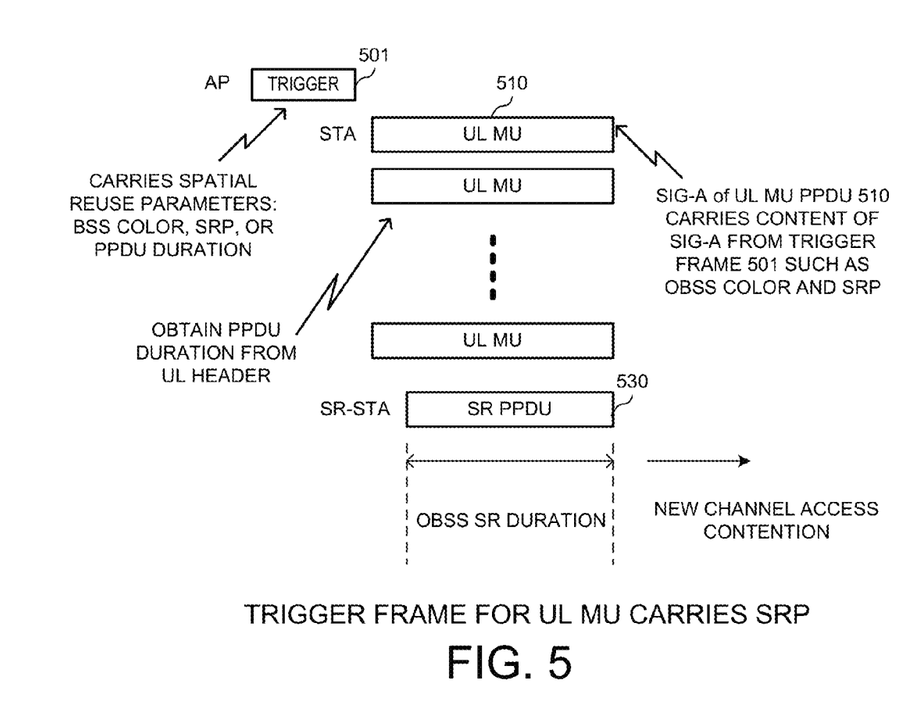
FIG. 5 illustrates a first example of a trigger frame for UL MU that carries Type-1 SRP for SR transmission within a PPDU duration.

FIG. 5 illustrates a first example of a trigger frame 501 for uplink multi user (UL MU) operation that carries Type 1 SRP for SR transmission within a PPDU duration. In the example of FIG. 5, the trigger frame 501 is transmitted from an AP for triggering subsequent UL MU transmission. Trigger frame 501 carries the OBSS color, the AP SRP, and/or the uplink PPDU duration. Upon receiving the trigger frame 501, the SR-STA can initiate a spatial reuse transmission 530 with TPC within the uplink PPDU duration. Because the TX power of the SR-STA is determined based on the SRP of the AP, such spatial reuse transmission will not interfere the subsequent UL MU signal reception by the AP. Optionally, the SR-STA can also obtain the PPDU duration from the UL MU PPDU header. For example, the SIG-A of UL MU PPDU 510 carries the content of SIG-A of trigger frame 501 such as OBSS color and SRP. Therefore, the SR-STA can obtain SRP from trigger frame 501 transmitted from the AP or from UL MU PPDU 510 transmitted by a nearby non-AP stations. If the trigger frame is out of range of the SR-STA, SR-STA can still transmit during PPDU duration. The responding SR-STA needs to transmit with TPC as well.

Figure 6:
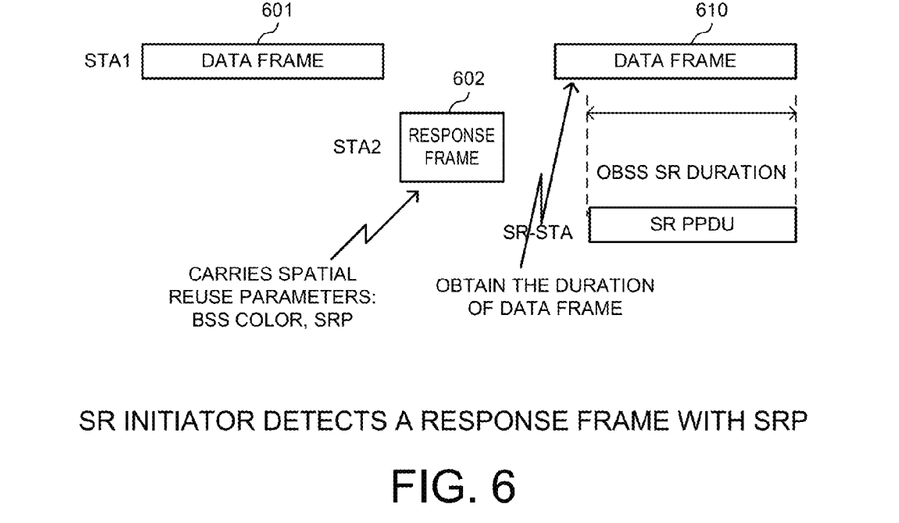
FIG. 6 illustrates a second example of a response frame that carries Type-2 SRP for SR transmission within a PPDU duration.

FIG. 6 illustrates a second example of a response frame that carries Type 1 SRP for SR transmission within a PPDU duration. In the example of FIG. 6, STA1 and STA2 engages ongoing frame exchange by transmitting data frames 601 and 602. If the SR initiator (the initiating SR-STA) detects a response frame 602 from STA2 with SRP and BSS color, the SR initiator can initiate a spatial reuse transmission with TPC in the PPDU duration. The SR initiator can obtain the duration of data frame 610, which may carry more information such as the BSS color and the SRP as well. Note that a responding SR-STA also needs to transmit with TPC.

In the case of Type 1 SRP, the SRP is signaled by the receiver to protect the recipient of the ongoing OBSS frame exchange. In some scenarios, the transmitter can signal the SRP for the receiver, e.g., when the receiver is a legacy station that does not support the signaling of SRP. Now referring back FIG. 5, the trigger frame 501 is sent by an AP, and received by multiple STAs including the SR-STA. The SR-STA applies TPC to ensure that any spatial reuse frame exchange will not causing interference to the AP and the other STAs. The noise floor of the other STAs can be provided by the AP. Specifically, for the SR-STA not to interfere with the other STA reception, the required TX power can be determined as follows.

TPC for SR-STA:
TX-PWR_SR-STA−Space Loss (SR-STA to AP)<TX-PWR_STA−Space Loss (STA to AP)−MCS Margin;
Because
Space Loss (AP to SR-STA)=TX-PWR_AP−RSSI (SR-STA from AP);
Space Loss (AP to STA)=TX-PWR_AP−RSSI (STA from AP)
Therefore
TX-PWR_SR-STA−(TX-PWR_AP−RSSI (SR-STA from AP))<TX-PWR_STA−(TX-PWR_AP−RSSI (STA from AP)−MCS Margin;
TX-PWR_SR-STA<TX-PWR_STA−RSSI (SR-STA from AP)+RSSI (STA from AP)−MCS Margin;
If we define Type 2 SRP as:
Type 2 SRP=TX-PWR_STA+RSSI (STA from AP)−MCS Margin;

Then we have simplified TPC for SR-STA:
TX-PWR_SR-STA<SRP−RSSI (SR-STA from AP);
Note that Type 2 SRP can be carried in UL MU PPDU header. The MCS margin is equal to the SNR required for the MCS plus margin. If signal is transmitted by AP, and the STA and the SR-STA have different bandwidths, then the TX powers and RSSIs in the above formula should be replaced by power density.

Figure 7:
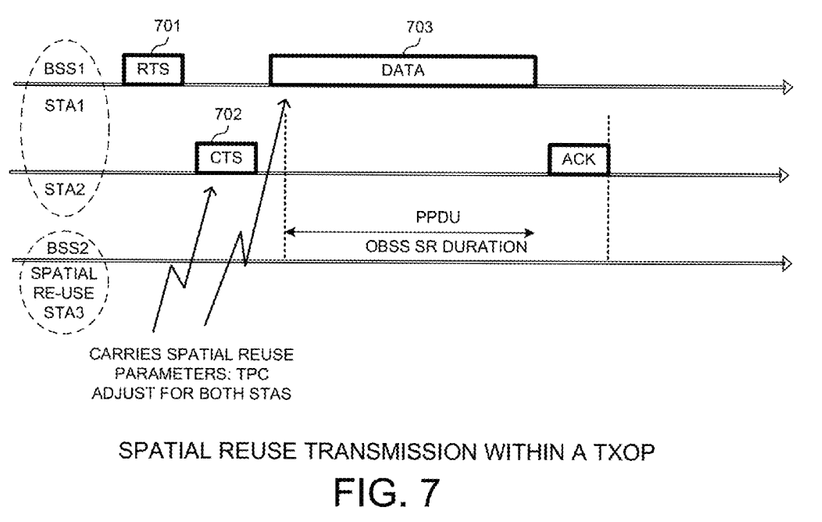
FIG. 7 illustrates a spatial reuse transmission within a TXOP based on HE-CTS and HE-RTS carrying a Type 2 SRP by the transmitter.

FIG. 7 illustrates a spatial reuse transmission within a TXOP based on HE-CTS and HE-RTS carrying Type 2 SRP by the transmitter. In the example of FIG. 7, STA1 and STA2 belong to a first BSS1, while spatial re-use STA3 belongs to a second BSS2. STA1 and STA2 engages in an ongoing frame exchange. Spatial re-use STA3 initiates a spatial re-use frame exchange with other stations in BSS2. STA1 sends a request to send (RTS 701), while STA2 responds with a clear to send (CTS 702). STA1 then sends a data frame 703. The CTS and data frame 703 carries spatial reuse parameters, TXOP duration, and BSS color for both STA1 and STA2. Upon detecting the data frame, STA3 can initiate spatial reuse transmission with TPC in the remaining PPDU duration of the data frame to protect STA1 and STA2.

Figure 8:
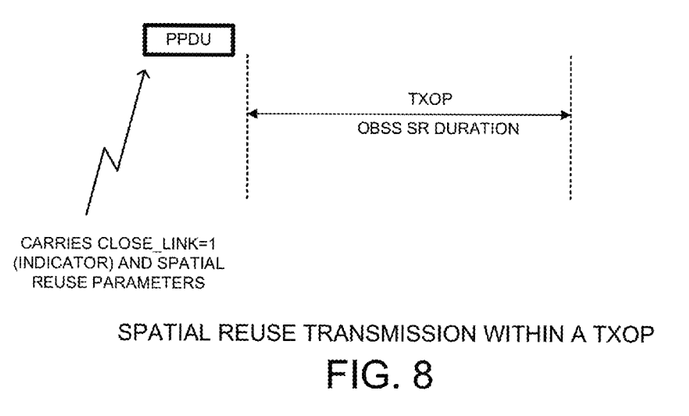
FIG. 8 illustrates a spatial reuse transmission within a TXOP for close link.

FIG. 8 illustrates a spatial reuse transmission within a TXOP for close link. In the example of FIG. 8, if the SR-STA observes a packet (PPDU) with close link indicator equal to one (Close_Link=1) and SRP, then the SR-STA can initiate spatial reuse transmission with TPC in the TXOP duration. Note the responding SR-STA needs to transmit with TPC as well.

Figure 9:
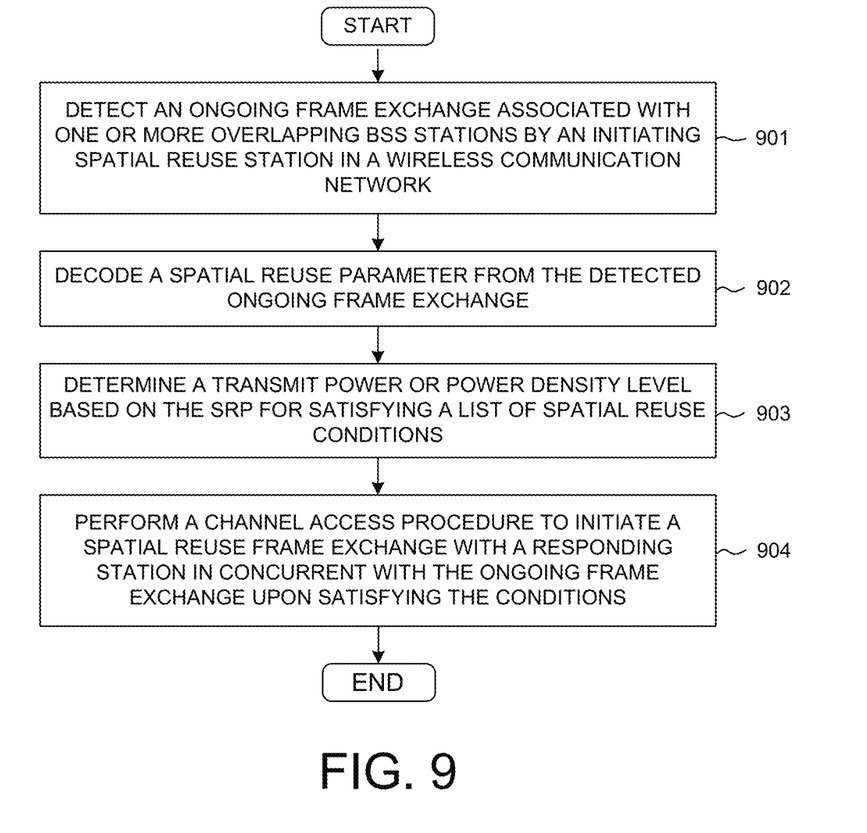
FIG. 9 is a flow chart of a method of spatial reuse with TPC and adaptive CCA level in accordance with one novel aspect.

FIG. 9 is a flow chart of a method of spatial reuse with TPC and adaptive CCA level in accordance with one novel aspect. In step 901, an initiating spatial reuse station (SR-STA) detects an ongoing frame exchange associated with one or more overlapping basic service set (OBSS) stations (OBSS-STAs) in a wireless communication network. In step 902, the SR-STA decodes a spatial reuse parameter (SRP) from the detected ongoing frame exchange. In step 903, the SR-STA determines a transmit power or power density level based on the SRP for satisfying a list of spatial reuse conditions. In step 904, the SR-STA performs a channel access procedure to initiate a spatial reuse frame exchange with a responding SR-STA in concurrent with the ongoing frame exchange upon satisfying the list of spatial reuse conditions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
   detecting an ongoing frame exchange associated with one or more overlapping basic service set (OBSS) stations (OBSS-STAs) by an initiating spatial reuse station (SR-STA) in a wireless communication network;
   decoding a spatial reuse parameter (SRP) from the detected ongoing frame exchange;
   determining a transmit power or power density level based on the SRP if a list of spatial reuse conditions is satisfied; and
   performing a channel access procedure to initiate a spatial reuse frame exchange with a responding SR-STA in concurrent with the ongoing frame exchange upon satisfying the list of spatial reuse conditions.

2. The method of claim 1, wherein the spatial reuse parameter is carried as a single parameter in a signaling field of the ongoing frame exchange.

3. The method of claim 2, wherein the signaling field further comprises a BSS color and a frame exchange duration.

4. The method of claim 1, wherein the list of spatial reuse conditions comprises an estimated interference from the SR-STA is below a threshold, a network allocation vector (NAV) is not set, a backoff counter has counted to zero, and on-going frame exchange is from the same OBSS.

5. The method of claim 1, wherein the spatial reuse parameter comprises a transmit power or power density level combined with a received interference power or power density level of one of the OBSS-STAs.

6. The method of claim 5, where in the determined TX power or power density level results a spatial reuse signal from the SR-STA arriving at a receiving OBSS-STA is below an acceptable interference power or power density level of the receiving OBSS-STA.

7. The method of claim 1, wherein the spatial reuse parameter comprises a TX power or power density level combined with a received signal power or power density level of one of the OBSS-STAs minus a signal to noise ratio (SNR) based on a used modulation and coding scheme (MCS).

8. The method of claim 7, where in the determined TX power or power density level results a spatial reuse signal from the SR-STA arriving at a receiving OBSS-STA is below a required SNR level of the receiving OBSS-STA based on the used MCS and a transmit power level of a transmitting OBSS-STA.

9. The method of claim 1, wherein the SR-STA calculates a path loss from the SR-STA to one of the OBSS-STAs based on the spatial reuse parameter.

10. The method of claim 1, wherein the spatial reuse parameter is carried by an uplink frame sent from one of the OBSS-STAs for an uplink multiuser operation, wherein the spatial reuse parameter is transferred from a trigger frame to the uplink frame.

11. The method of claim 1, wherein the spatial reuse parameter is carried by a response frame, a clear-to-send (CTS) frame in response to a request-to-send (RTS) frame, or a subsequent data frame.

12. A spatial reuse station (SR-STA), comprising:
a radio signal detector that detects an ongoing frame exchange associated with one or more overlapping basic service set (OBSS) stations (OBSS-STAs) by an initiating spatial reuse station (SR-STA) in a wireless communication network;
a decoder that decodes a spatial reuse parameter (SRP) from the detected ongoing frame exchange;
a power control circuit that determines a transmit power or power density level based on the SRP for satisfying a list of spatial reuse conditions; and
a channel access circuit that performs a channel access procedure to initiate a spatial reuse frame exchange with a responding SR-STA in concurrent with the ongoing frame exchange upon satisfying the list of spatial reuse conditions.

13. The STA of claim 12, wherein the spatial reuse parameter is carried as a single parameter in a signaling field of the ongoing frame exchange.

14. The STA of claim 12, wherein the signaling field further comprises a BSS color and a frame exchange duration.

15. The STA of claim 12, wherein the list of spatial reuse conditions comprises an estimated interference from the SR-STA is below a threshold, a network allocation vector (NAV) is not set, a backoff counter has counted to zero, and on-going frame exchange is from the same OBSS.

16. The STA of claim 12, wherein the spatial re-use parameter comprises a transmit power or power density level combined with a received interference power or power density level of one of the OBSS-STAs.

17. The STA of claim 16, where in the determined TX power or power density level results a spatial reuse signal from the SR-STA arriving at a receiving OBSS-STA is below an acceptable interference power or power density level of the corresponding OBSS-STA.

18. The STA of claim 12, wherein the spatial reuse parameter comprises a TX power or power density level combined with a received signal power or power density level of one of the OBSS-STAs minus a signal to noise ratio (SNR) based on a used modulation and coding scheme (MCS).

19. The STA of claim 18, where in the determined TX power or power density level results a spatial reuse signal from the SR-STA arriving at a receiving OBSS-STA is below a required SNR level of the receiving OBSS-STA based on the used MCS and a transmit power level of a transmitting OBSS-STA.

20. The STA of claim 12, wherein the SR-STA calculates a path loss from the SR-STA to one of the OBSS-STAs based on the spatial reuse parameter.

21. The STA of claim 12, wherein the spatial reuse parameter is carried by an uplink frame sent from one of the OBSS-STAs for an uplink multiuser operation, wherein the spatial reuse parameter is transferred from a trigger frame to the uplink frame.

22. The STA of claim 12, wherein the spatial reuse parameter is carried by a response frame, or a clear-to-send (CTS) frame in response to a request-to-send (RTS) frame, or a subsequent data frame.

* * * * *